US007738174B2

(12) United States Patent
Lee et al.

(10) Patent No.: US 7,738,174 B2

(45) Date of Patent: Jun. 15, 2010

(54) SYSTEM FOR OPTICAL COLOR DIVISION

(75) Inventors: Chi-Hung Lee, Tainan County (TW); Hui-Hsiung Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 114 days.

(21) Appl. No.: 12/242,941

(22) Filed: Oct. 1, 2008

(65) Prior Publication Data

US 2010/0033828 A1 Feb. 11, 2010

(30) Foreign Application Priority Data

Aug. 8, 2008 (TW) .............................. 97130379 A

(51) Int. Cl.
*G02B 27/10* (2006.01)
*G02B 27/12* (2006.01)
*G02B 27/14* (2006.01)

(52) U.S. Cl. ........................ 359/618; 359/636; 359/639

(58) Field of Classification Search ................. 359/618, 359/620–623, 629, 636, 639
See application file for complete search history.

(56) References Cited

U.S. PATENT DOCUMENTS

| | | | |
|---|---|---|---|
| 4,807,978 | A | 2/1989 | Grinberg et al. |
| 5,615,024 | A | 3/1997 | May et al. |
| 5,764,389 | A | 6/1998 | Grinberg et al. |

FOREIGN PATENT DOCUMENTS

| | | |
|---|---|---|
| TW | M249217 | 11/2004 |

*Primary Examiner*—Ricky L Mack
*Assistant Examiner*—Brandi N Thomas
(74) *Attorney, Agent, or Firm*—Jianq Chyun IP Office

(57) ABSTRACT

A system for optical color division receives an incident light from a side and divides the incident light into a plurality of color lights. The system includes a light guide plate for allowing the incident light to have total internal reflection back and forth therein. A surface of the light guide plate has a plurality of microstructures, which can destroy the total internal reflection and enable the light to exit.

16 Claims, 6 Drawing Sheets

212a
212
216
210a
210
208a
214f
208
206
206a
204
202
202a
N
C3=62.94°
C1=59.4°
C2=60.94°
62°
200
214e
214d
214c
214b
214a
214

212
210
208
206
204
202
250
62°
214
214a
C2=60.94°
N
214b
214c
C3=62.94°
N
214d
214e
212a
216
210a
208a
214f
206a
202a
R
G
B

SYSTEM FOR OPTICAL COLOR DIVISION

CROSS-REFERENCE TO RELATED APPLICATION

This application claims the priority benefit of Taiwan application serial no. 97130379, filed on Aug. 8, 2008. The entirety of the above-mentioned patent application is hereby incorporated by reference herein and made a part of specification.

BACKGROUND OF THE INVENTION

1. Field of the Invention

The present invention relates to a technology for optical color division, which can provide a light source of a desired color for image displaying and capturing.

2. Description of Related Art

The color of an image is generally formed by a plurality of primary color lights and variations in gray scales of the primary color lights. Most commonly used primary color lights are, for example, red (R), green (G), and blue (B).

In a flat display, a back light source is often used with a liquid crystal spatial light modulator and color filters (CFs) in order to present true-color images. An image sensor in a digital camera also needs CFs, and calculates the color differences to present the original color of an object. In a large-size system such as a color video camera and a rear-projection television, three-piece or two-piece prism sets or CFs are employed with a collimated light source in order to present true-color images. When the system uses a CF, each colored pixel on the CF can only present a single primary color of the three primary colors, that is, red, green and blue (RGB), and approximately two thirds of the energy of the incident white light will be absorbed, thereby reducing the optical efficiency of the system and shortening the service life of the battery. Moreover, the manufacturing process of the CFs is complex, and at least one lithography process must be performed on semiconductors for each primary color, resulting in a high cost.

Therefore, in the conventional art, manufacturers or designers in related arts proposed solutions in which the three primary colors of RGB are separated through optical light splitting, thereby avoiding the use of the CFs.

U.S. Pat. No. 5,615,024A discloses an optical structure for replacing the CF, which mainly utilizes a blazed grating to separate the three primary colors. When applied to a panel, each primary color is corresponding to one pixel (mainly a transmitted and diffracted light of the first order). Since the transmitted and diffracted light at the first order is used and a large angle is formed between an incident light and an emergent light, the incident light must enter the blazed grating at a large angle such that the emergent light enters the liquid crystal layer perpendicularly. If a perpendicular incident light enters the blazed grating, the emergent light can only enter the liquid crystal layer at a large angle, thereby limiting the applicability.

In addition to the above conventional art based on optical elements, many other designs have been proposed. However, the optical structures of the CFs in the conventional art have their own advantages and disadvantages. The light-splitting technologies based on optical elements are still researched and developed in order to achieve the best performance.

SUMMARY OF THE INVENTION

Accordingly, the present invention is directed to a light-splitting structure using optical element modules instead of color filters (CFs), which can, for example, generate three primary color lights while maintaining the optical efficiency. The lights are corresponding to panel pixels and are incident on a liquid crystal layer in a nearly perpendicular direction.

A system for optical color division is provided. The system receives an incident light from a side and divides the incident light into a plurality of color lights. The system includes a bottom plate, a first light guide plate, a second light guide plate, and a third light guide plate. The first light guide plate has a first surface and a second surface. The second surface has a plurality of microstructures. The first surface is disposed on the bottom plate. The incident light is reflected back and forth between the first surface and the second surface. A part of the incident light penetrates the microstructures, thereby generating a transmitted light. The second light guide plate has an incident surface and a grating structure surface, and is disposed on the first light guide plate. The incident surface receives the transmitted light, and the grating structure surface divides the transmitted light into the color lights. The third light guide plate is disposed on the second light guide plate. A light exit surface of the third light guide plate has a plurality of protruding refractive structures for refracting the color lights to a predetermined direction.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
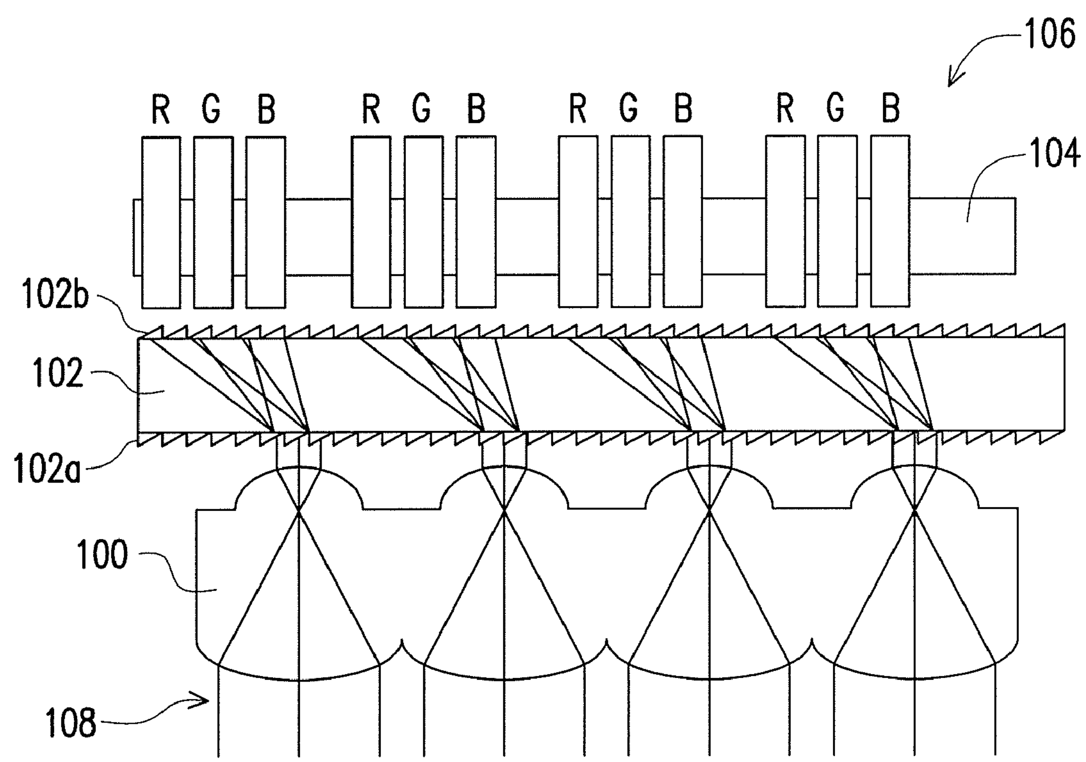
FIG. 1 is a schematic cross-sectional view of a system for optical color division applied in a liquid crystal display system according to the present invention.

Reference will now be made in detail to the present embodiments of the invention, examples of which are illustrated in the accompanying drawings. Wherever possible, the same reference numbers are used in the drawings and the description to refer to the same or like parts.

In the present invention, an optical mechanism is generally, for example, using periodic polygon optical structures to form a grating. The grating is, for example, a blazed grating that has a light-splitting effect and diffraction efficiency. A relative angle between an incident light on the grating and an inclined surface of the grating is adjusted, such that the direction of a diffracted light is identical with the refraction direction when a grating facet is used as the refractive plane. At this point, the optical diffraction efficiency in the diffraction direction (or the refraction direction of the facet) is optimal.

Generally speaking, to achieve a good light-splitting effect for optical bands, the light beam is incident on the grating in a highly collimated manner. The light-splitting structure of the present invention has grating structures, which can, for example, generate a highly collimated back light source. The system for color division of the present invention, for example, integrates three optical layers having specific refractive indexes and microstructures and three optical films having periodic polygon structures. In addition, the present invention is further applicable to a polarized incident light, such that the application efficiency of the light is further improved when the present invention is used in a panel or an opto-mechanical system.

Some embodiments are given below for describing the present invention. However, the present invention shall not be limited to the listed embodiments, and the listed embodiments can also be properly combined with one another. Also, the description of the present invention is given below by taking RGB primary color lights as an example. As for wavelength, the primary color lights of the present invention are not limited to the RGB wave bands.

FIG. 1 is a schematic cross-sectional view of a system for optical color division applied in a liquid crystal display system according to the present invention. Referring to FIG. 1, in the present invention, a grating of an optical element is used to divide the primary color lights, which is further applicable to a liquid crystal display system. A converging microlens 100 receives and converges a white light 108. The microlens on the converging microlens 100 is disposed corresponding to a predetermined position, for example corresponding to the position of a pixel. The converged white light 108 is divided into RGB three primary color lights by a two-layer grating structure member 102. The grating structure member 102 has, for example, two layers of grating structures 102*a* and 102*b*. Based on the optical diffraction of the grating, the converged white light 108 is divided into RGB three primary color lights by the grating structure 102*a* according to different wavelengths of RGB. The divided RGB three primary color lights will be deflected in their advancing directions. The divided RGB three primary color lights are then converted back to an emergent direction nearly perpendicular to the grating structure member 102 by the grating structure 102*b* on the other side. Then, the lights emergent from the grating structure member 102 enter subpixels 106 on a liquid crystal display panel 104. Three subpixels 106 display gray scales corresponding to R, G, and B to form a pixel.

Figure 2:
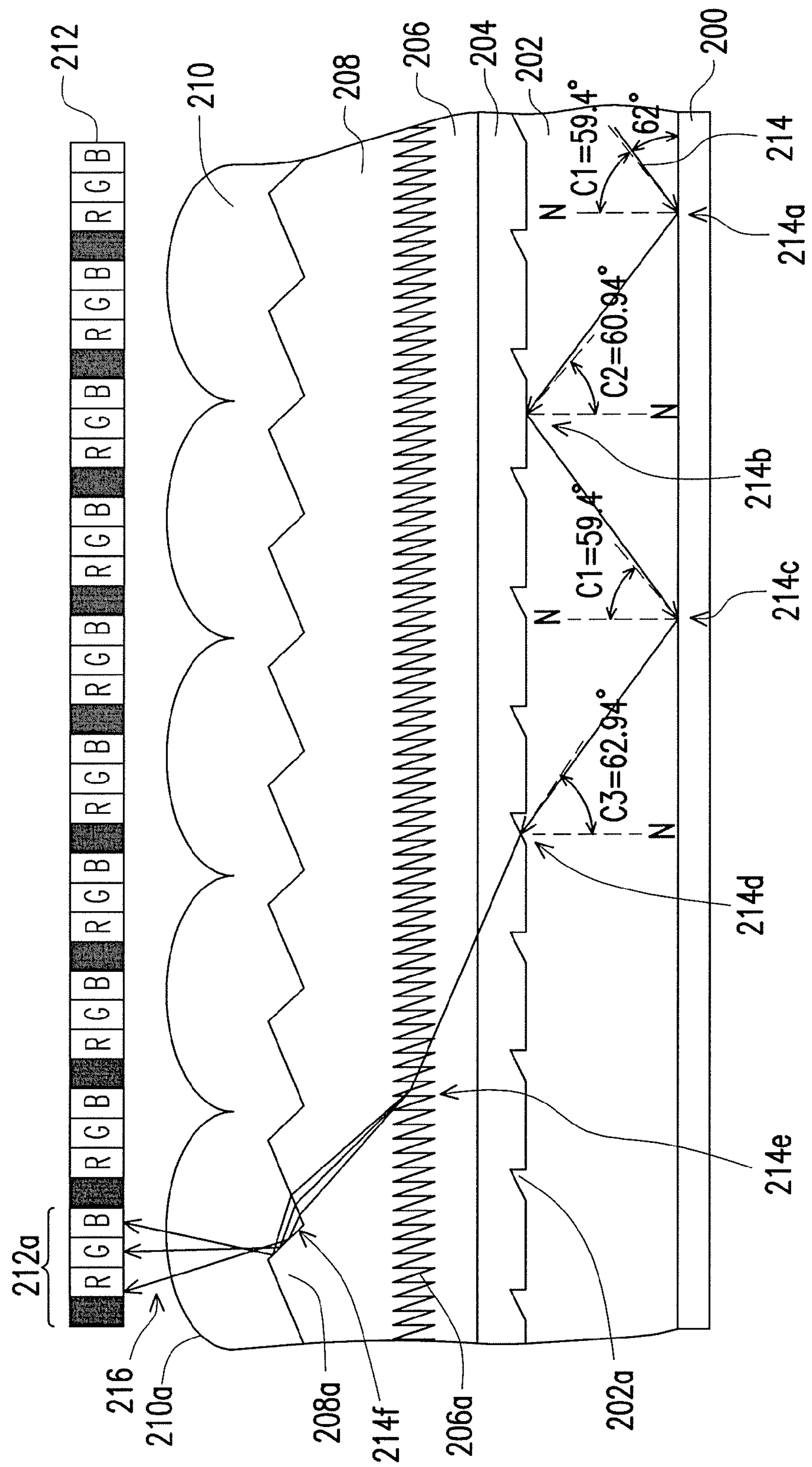
FIG. 2 is a schematic cross-sectional view of a system for optical color division applied in a liquid crystal display system according to an embodiment of the present invention.

In the structure in FIG. 1, in view of the thickness of the entire element, a long path, for example, is needed. In addition, some other embodiments are also provided in the present invention based on the basic structural design in FIG. 1. FIG. 2 is a schematic cross-sectional view of a system for optical color division applied in a liquid crystal display system according to an embodiment of the present invention. Referring to FIG. 2, the basic structure of the system for optical color division includes, for example, a bottom plate 200, a light guide plate 202, a light guide plate 204/206, and a light guide plate 208. The bottom plate 200 is, for example, a light guiding material having a refraction coefficient n0 or a reflective sheet, and has a reflective effect, which will be described below. The light guide plate 202 has two surfaces. One of the two surfaces has a plurality of microstructures 202*a*, and the other surface is disposed on the bottom plate 200. The microstructures 202*a* have local geometries for changing the incident angle of the light incident on this area so as to destroy the total internal reflection and allow the light to penetrate this area. For example, the cross-sectional geometries of the microstructures 202*a* are protruding triangles, and the incident angle is changed by inclined surfaces thereof, so as to enable the light in this area to penetrate, for example, in a refracted manner. However, the geometries of the microstructures 202*a* are not limited to the protruding structures. In other words, the microstructures 202*a* are, for example, recessed structures. Each of the microstructures 202*a* has at least one light exit surface for changing the total internal reflection into refraction, so as to enable the light to penetrate. The function of the microstructures 202*a* will be described in the following.

The refraction coefficient of the first light guide plate 202 is n1. An incident light 214 is reflected back and forth between the two surfaces of the first light guide plate 202. For example, an optical total internal reflection occurs. For example, the light guide plate 204 having a refraction coefficient n2 is disposed on the light guide plate 202. By selecting the refraction coefficient n2 to be smaller than the refraction coefficient n1 of the light guide plate 202, the total internal reflection will occur. For example, if the incident light 214 is incident from one side of the light guide plate 202 at a predetermined angle, the light will be reflected back and forth and then guided to the other side within the light guide plate 202. Given the normal direction N of the bottom plate 200 as the reference direction, an incident light at the angle of 62° is incident on the bottom plate 200 at an incidence point 214*a*, and is reflected to an incidence point 214*b*. In practice, for the incident light beam, the incident angle may have a deviation range of several degrees, for example a deviation range of 2°. The incident light is then reflected to an incidence point 214*c* from the incidence point 214*b*. As described above, the plurality of the microstructures 202*a* is distributed on the light guide plate 202. In this case, the light 214 is then totally internally reflected to an incidence point 214*d* from the incidence point 214*c*, and falls on the inclined surfaces of the microstructures 202*a*. The inclined surfaces of the microstructures 202*a* change the incident angel so as to change the total internal reflection into refraction. Therefore, a part of the incident light penetrates when it is incident on the microstructures 202*a*, thereby generating a transmitted light.

Figure 3:
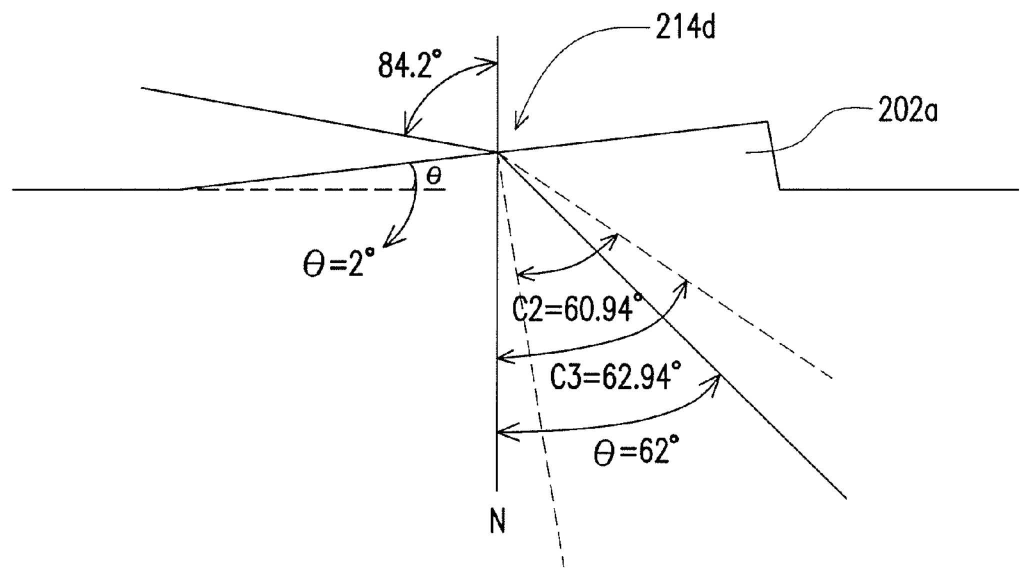
FIG. 3 is a schematic view of the operating mechanism of a microstructure 202*a* of a light guide plate 202 according to an embodiment of the present invention.

FIG. 3 is a schematic view of the operating mechanism of a microstructure 202*a* of the light guide plate 202 according to an embodiment of the present invention. Referring to FIG. 3, a light exit surface of the light guide plate 202 is provided with microstructures 202*a*. A cross-sectional shape of each of the microstructures 202*a* is, for example, a protruding triangle. An inclination angle of an inclined surface uses the horizontal direction of the light guide plate 202 as the reference direction, and is deviated by 2°, for example. The N direction is the direction perpendicular to the whole light guide plate 202. When an incident light of, for example, 62° relative to the N direction is incident on a flat area of the light guide plate 202, a total internal reflection occurs. However, when the light is incident on the inclined surface of one microstructure 202*a* of the light guide plate 202, the total internal reflection disappears and a reflection occurs because the inclined surface is deviated by 2°. A large part of the light penetrates, and the remaining small part of the light is still reflected, continues traveling within the light guide plate 202 in a same mechanism, and penetrates through other suitable microstructures 202*a*. After a suitable refraction coefficient is selected, the part of the incident light of, for example, 62° that penetrates will emerge at an angle of 84.2°. It is allowed that the incident light beam is incident in an angle range. FIG. 3 merely schematically describes the mechanism for changing the total internal reflection into refraction and penetration.

Next, the function of the light guide plate 204 is to create the total internal reflection for the light incident at some angles based on the difference between the refraction coefficient n2 and the refraction coefficient n1 of the light guide plate 202. Then, a grating member 206 is disposed on the light guide plate 204. The light guide plate 204 and the grating member 206 can also be considered as an integrated light guide plate. A refraction coefficient n3 of the grating member 206 may be equal to n2 or not equal to n2. If n3 equals n2, the light can penetrate directly. For example, the light guide plate 204 and the grating member 206 are made of a same material, and may further be a single-piece optical element.

In this embodiment, the light guide plate 208 has an incident surface and a grating structure surface 206*a*, and is disposed on the light guide plate 204. The incident surface receives the light penetrating the light guide plate 202 from the microstructure 202*a* area, and then the grating structure surface divides the light into, for example, RGB lights of different wave bands based on the relationship between diffraction and wavelength. Then, another light guide plate 208 is disposed on the light guide plate 206. In this embodiment, the light guide plate 208 and the light guide plate 206 are tightly connected as a conformal structure. However, for actual designs and arrangements, the conformal compact structure is not exclusive.

Then, in order to better use the divided lights, for example, to support the display of subpixels of an image displaying panel 212, a light exit surface of the light guide plate 208 can further include a plurality of protruding refractive structures 208*a* for refracting the color lights into a predetermined direction, for example, into a direction nearly perpendicular to the light guide plate 208. Each of the protruding refractive structures 208*a* is, for example, designed with two inclined surfaces. One inclined surface receives the divided color lights at an incidence point 214*f* and enables them to be refracted to the other inclined surface. The inclination angle of this inclined surface has a reflective effect such that the color lights emerge in a predetermined direction.

The light guide plate 208 can be used with a converging member 210. Thus, the total internal reflection may also occur by properly selecting the difference between refraction coefficients, so as to enable the light to emerge in a predetermined direction. The converging member 210 has a plurality of microlenses 210*a*, which are disposed, for example, at positions corresponding to pixels. The microlenses 210*a* converge the divided color lights properly to generate an emergent light 216, which is respectively corresponding to RGB subpixels of a pixel 212*a* of the image displaying panel 212, and functions as a primary color light source for displaying.

Figure 4:
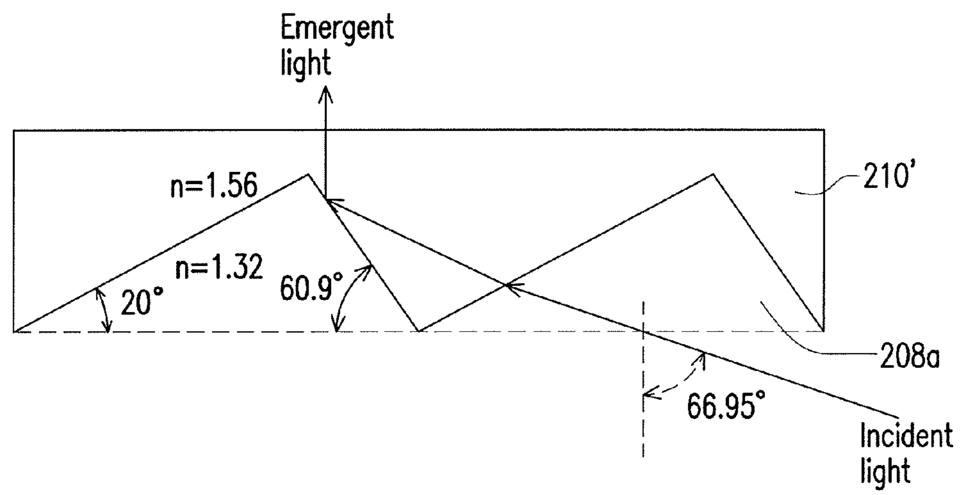
FIG. 4 is a schematic view of the operating mechanism of a protruding refractive structure 208*a* in FIG. 2 according to an embodiment of the present invention.

FIG. 4 is a schematic view of the operating mechanism of a protruding refractive structure 208*a* in FIG. 2 according to an embodiment of the present invention. Referring to FIG. 4, for example, when an incident light enters the protruding refractive structure 208*a* at an incident angle of 66.95°, it falls on an inclined surface thereof. The refraction coefficient n=1.32 of the protruding refractive structure 208*a* is smaller than the refraction coefficient n=1.56 of a converging member 210'. Therefore, a total internal reflection occurs on the other inclined surface having an inclination angle of 20°. In this case, the light emerges in a nearly perpendicular direction, thereby becoming an emergent light. FIG. 4 is merely a schematic view of the mechanism, and actual design conditions may vary as required.

Figure 5:
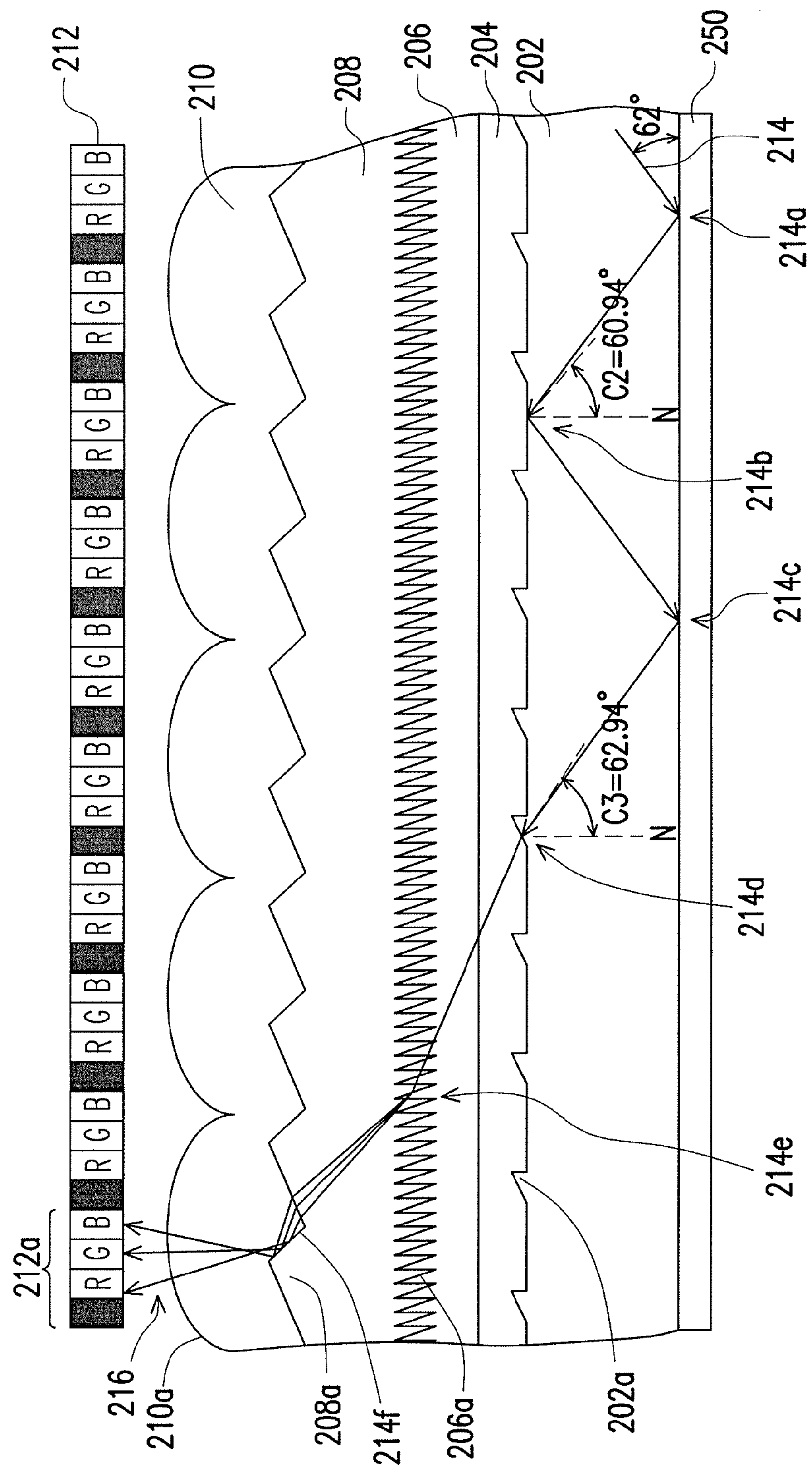
FIG. 5 is a schematic cross-sectional view of a system for optical color division applied in a liquid crystal display system according to an embodiment of the present invention.

FIG. 5 is a schematic cross-sectional view of a system for optical color division applied in a liquid crystal display system according to an embodiment of the present invention. Referring to FIG. 5, the structure in FIG. 5 is similar to the structure and mechanism in FIG. 2, and the difference lies in that a bottom plate 250 is disposed as a reflective layer. Therefore, the refraction coefficient of the bottom plate 250 does not need to be considered.

Figure 6:
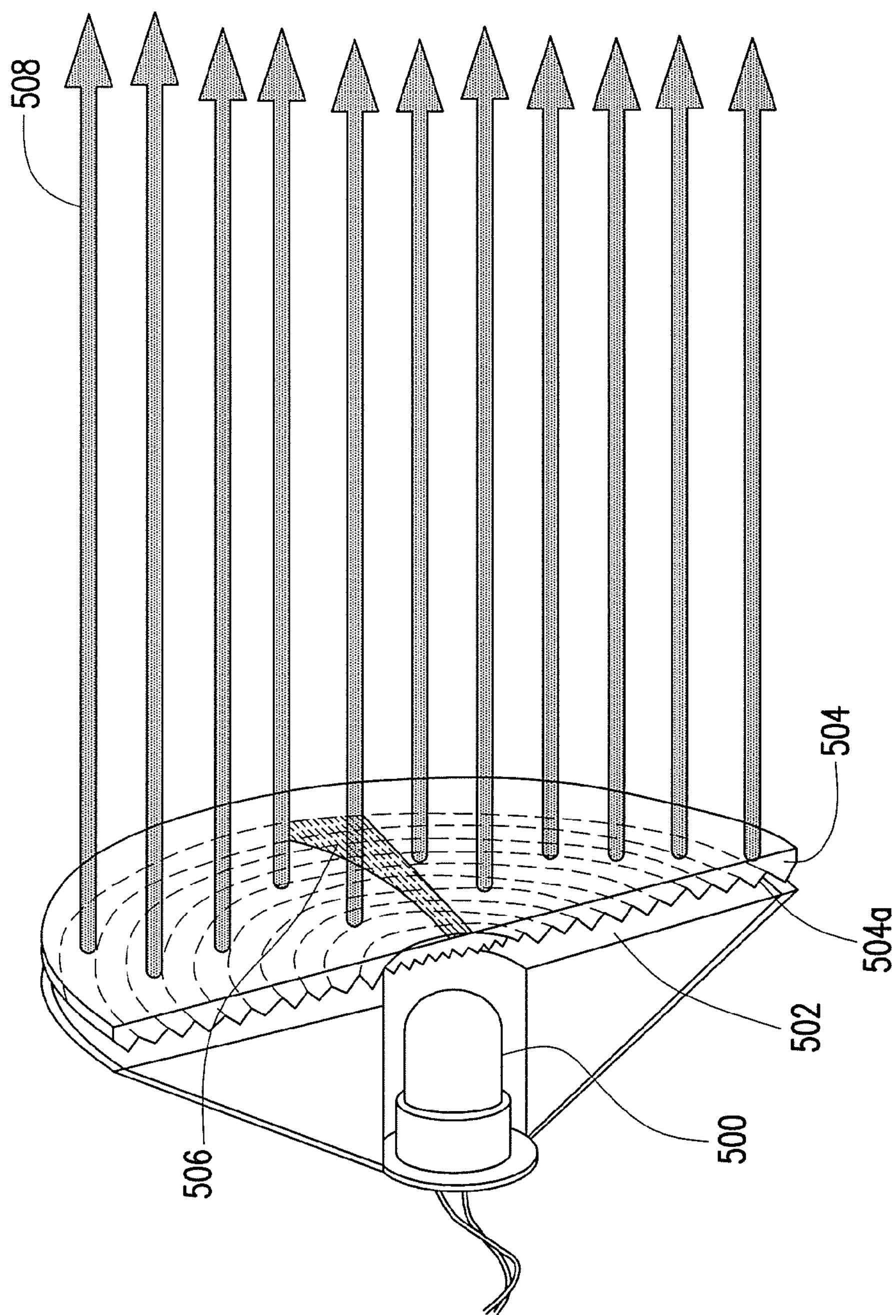
FIG. 6 is a schematic three-dimensional cross-sectional perspective view of a planar system for optical color division according to an embodiment of the present invention.

FIG. 6 is a schematic three-dimensional cross-sectional perspective view of a planar system for optical color division according to an embodiment of the present invention. The above structure and mechanism are also applicable to planar structures such as ring structures. The light from a local light source 500 at the center is incident on a light guide optical element 502 from a side, and a wave surface of the light source 500 is identical with the structure in FIG. 2. However, protruding microstructures 504*a* on a light guide plate 504 are annularly arranged to achieve a planar light emission. The incident light is guided into diverging lights 506, and penetrates the protruding microstructures 504*a* to form a planar light source 508.

Figure 7:
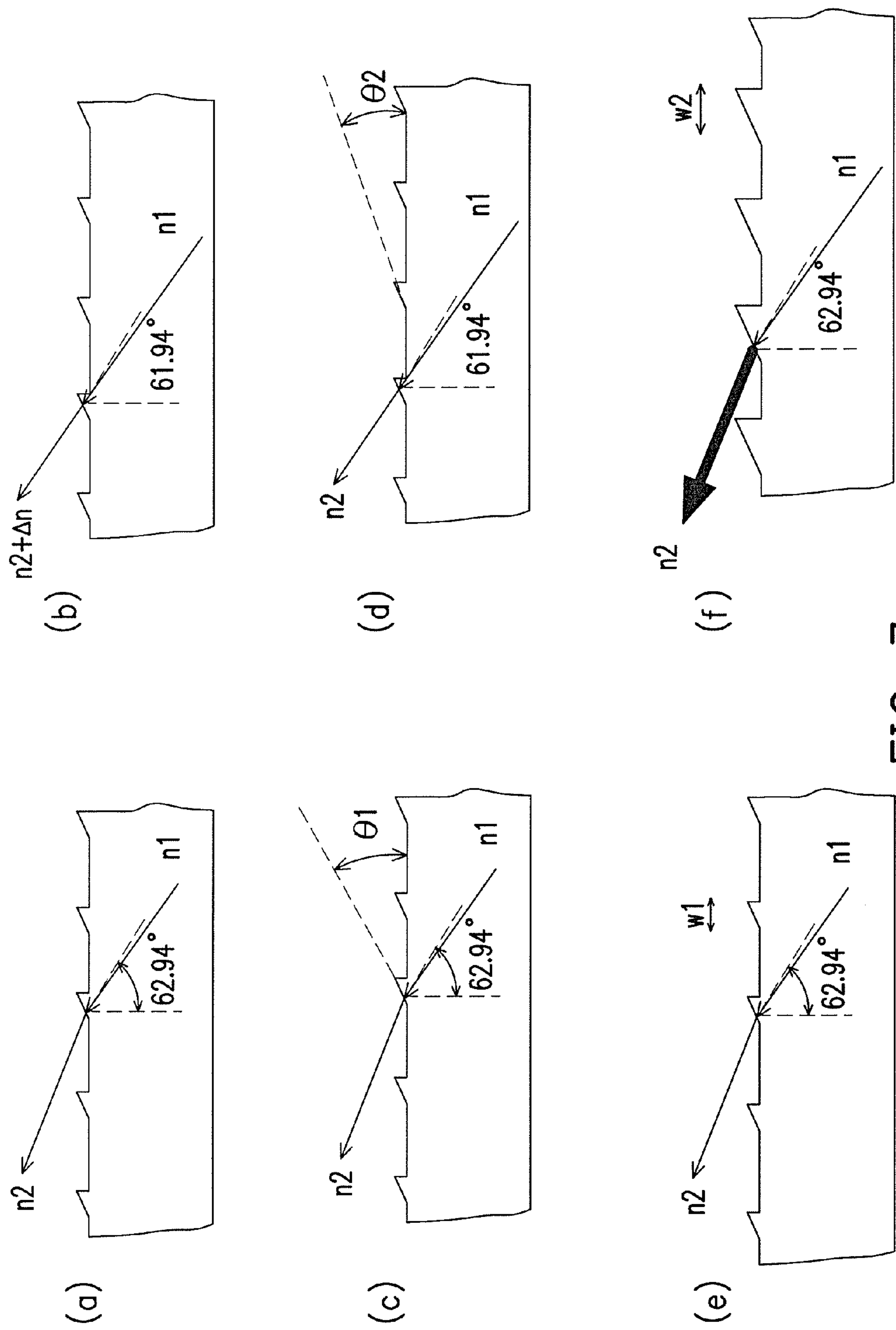
FIG. 7 is a schematic view of variations of a microstructure of a light guide plate according to an embodiment of the present invention.

FIG. 7 is a schematic view of variations of a microstructure of a light guide plate according to an embodiment of the present invention. Referring to FIG. 7, two refraction coefficients n1 and n2 in FIG. 7(*a*) are used as references, and the design is, for example, based on a light incident at an incident angle of 62.94°. In FIG. 7(*b*), the refraction coefficient n2 can be properly adjusted so as to change the incident angel to 61.94°. In FIG. 7(*c*), an inclination angle θ1 of an inclined surface of a microstructure can be adjusted to change the conditions of refraction and penetration. In FIG. 7(*d*), when the inclination angle θ1 is changed into an inclination angle θ2, the application for the incident angle of 61.94° can also be achieved. In FIG. 7(*e*), the width of the microstructure is W1, which determines how much light will penetrate. In FIG. 7(*f*), if the width of the microstructure in FIG. 7(*e*) is changed to W2, more light emerges.

In other words, design conditions of the embodiments above can be adjusted based on the same design principles, so as to achieve a desired performance.

The light guide design of the present invention can use a light incident from a side, guide the incident light to emerge from a plane, and further divide the incident light into primary color lights together with the subsequent diffractive structure, thereby improving the presentation of the color of the image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for optical color division, receiving an incident light from a side and dividing the incident light into a plurality of color lights, the system comprising:

a bottom plate;

a first light guide plate, comprising a first surface and a second surface, wherein the second surface comprises a plurality of microstructures, the first surface is disposed on the bottom plate, the incident light is reflected back and forth between the first surface and the second surface, and a part of the incident light penetrates the microstructures to generate a transmitted light;

a second light guide plate, comprising an incident surface and a grating structure surface, and disposed on the first light guide plate, wherein the incident surface receives the transmitted light, and the grating structure surface divides the transmitted light into the color lights; and a third light guide plate, disposed on the second light guide plate, wherein a light exit surface of the third light guide plate comprises a plurality of protruding refractive structures for refracting the color lights to a predetermined direction.

2. The system for optical color division according to claim 1, wherein the first light guide plate, the second light guide plate, and the third light guide plate constitute a compact laminated structure.

3. The system for optical color division according to claim 1, further comprising a microlens plate disposed on the third light guide plate for converging the color lights to a predetermined position.

4. The system for optical color division according to claim 3, wherein the first light guide plate, the second light guide plate, the third light guide plate, and the microlens plate constitute a compact laminated structure.

5. The system for optical color division according to claim 1, wherein the first surface and the second surface of the first light guide plate are in parallel.

6. The system for optical color division according to claim 1, wherein the bottom plate is a reflective layer or an optical material layer, and forms a total internal reflection with the first light guide plate.

7. The system for optical color division according to claim 1, wherein an interface between the first light guide plate and the second light guide plate other than the microstructures forms a total internal reflection surface.

8. The system for optical color division according to claim 1, wherein the second light guide plate is a layer of a single structure or of a composite structure.

9. The system for optical color division according to claim 1, wherein each of the protruding refractive structures of the third light guide plate comprises a valley structure formed by a first inclined surface, a second inclined surface, and a refraction coefficient, such that the color lights are reflected by the second inclined surface after emerging from the first inclined surface.

10. The system for optical color division according to claim 1, wherein the bottom plate, the first light guide plate, the second light guide plate, and the third light guide plate are a strip-shaped unit.

11. The system for optical color division according to claim 1, wherein the bottom plate, the first light guide plate, the second light guide plate, and the third light guide plate form a light-emitting surface.

12. The system for optical color division according to claim 1, wherein the bottom plate, the first light guide plate, the second light guide plate, and the third light guide plate are a planar unit, and the microstructures of the first light guide plate are a plurality of strip-shaped structures parallel to one another and extending in a direction.

13. The system for optical color division according to claim 1, wherein the bottom plate, the first light guide plate, the second light guide plate, and the third light guide plate are a planar unit, and the microstructures of the first light guide plate are a plurality of concentric surrounding strip-shaped structures.

14. The system for optical color division according to claim 1, wherein refraction coefficients of the first light guide plate, the second light guide plate, and the third light guide plate are respectively n1, n2, and n3, and a critical angle of a total internal reflection is determined by values of n1, n2, and n3.

15. The system for optical color division according to claim 1, wherein each of the microstructures of the first light guide plate comprises an inclined surface for destroying a total internal reflection and allowing the incident light to emerge to the second light guide plate.

16. The system for optical color division according to claim 1, further comprising a fourth light guide plate between the first light guide plate and the second light guide plate.

* * * * *